US012678747B2

(12) United States Patent
Ohnari et al.

(10) Patent No.: US 12,678,747 B2
(45) Date of Patent: Jul. 14, 2026

(54) SWIRLING-TYPE MICROBUBBLE GENERATION DEVICE

(71) Applicant: NANOPLANET RESEARCH INSTITUTE LTD., Kunisaki (JP)

(72) Inventors: Hirofumi Ohnari, Kunisaki (JP); Yoshito Ohnari, Kunisaki (JP)

(73) Assignee: NANOPLANET RESEARCH INSTITUTE LTD., Kunisaki (JP)

( * ) Notice: Subject to any disclaimer, the term of this patent is extended or adjusted under 35 U.S.C. 154(b) by 352 days.

(21) Appl. No.: 18/571,591

(22) PCT Filed: Jun. 22, 2022

(86) PCT No.: PCT/JP2022/024851
§ 371 (c)(1),
(2) Date: Dec. 18, 2023

(87) PCT Pub. No.: WO2022/270534
PCT Pub. Date: Dec. 29, 2022

(65) Prior Publication Data

US 2024/0278196 A1 Aug. 22, 2024

(30) Foreign Application Priority Data

Jun. 23, 2021 (JP) ................................ 2021-104006

(51) Int. Cl.
*B01F 23/2373* (2022.01)
*A47K 3/28* (2006.01)
*B01F 23/232* (2022.01)

(52) U.S. Cl.
CPC .......... *B01F 23/2373* (2022.01); *A47K 3/283* (2013.01); *B01F 23/232* (2022.01)

(58) Field of Classification Search
CPC .... A47K 3/283; B01F 23/232; B01F 23/2373
(Continued)

(56) References Cited

U.S. PATENT DOCUMENTS 6,382,601 B1 * 5/2002 Ohnari ................ B01F 23/2326 261/123
7,261,283 B1 * 8/2007 Ohnari ...................... C02F 7/00 261/DIG. 75
2019/0256385 A1 8/2019 Matsuda et al.

FOREIGN PATENT DOCUMENTS

AU 199938010 A1 1/2001
JP 2000-000447 A 1/2000
(Continued)

OTHER PUBLICATIONS

English Machine Translation of JP 2001038180 A (Year: 2001).*
(Continued)

*Primary Examiner* — Charles S Bushey
(74) *Attorney, Agent, or Firm* — HAUPTMAN HAM, LLP

(57) ABSTRACT

A swirling-type microbubble generation device can discharge a swirling gas-liquid mixture containing a large volume of microbubbles into air in a concentrated manner by being placed in proximity to a jetting target, or in proximity to or in close contact with the jetting target in the air, or discharging such a mixture into water in a hot water tank, and discharging a swirling gas-liquid mixture containing a large volume of microbubbles as shower. The microbubble generation device includes a cylindrical container body that is closed at one end by a wall body and is open at the other end, a gas inlet provided in the wall body of the cylindrical container body on the one end side, and a pressurized liquid inlet provided in part of the circumferential wall of the cylindrical container body such that it is open in the direction of the tangent to the inner circumference thereof.

11 Claims, 5 Drawing Sheets

(58) Field of Classification Search
USPC ........................................................ 261/79.2
See application file for complete search history.

(56) References Cited

FOREIGN PATENT DOCUMENTS

| | | | | |
|---|---|---|---|---|
| JP | 2001-038180 | A | | 2/2001 |
| JP | 2006-116365 | A | | 5/2006 |
| JP | 2007-111616 | A | | 5/2007 |
| JP | 4621796 | B1 | * | 1/2011 |
| JP | 2011-088045 | A | | 5/2011 |
| JP | 2013-052319 | A | | 3/2013 |
| JP | 5804175 | B1 | * | 11/2015 |
| JP | 2018-153779 | A | | 10/2018 |

OTHER PUBLICATIONS

English Machine Translation of JP 4621796 B1 (Year: 2011).*
English Machine Translation of JP 5804175 B1 (Year: 2015).*
PCT/ISA/210, "International Search Report for PCT International Application No. PCT/JP2022/024851," Aug. 23, 2022.

* cited by examiner

SWIRLING-TYPE MICROBUBBLE GENERATION DEVICE

RELATED APPLICATIONS

The present application is National Phase of International Application No. PCT/JP2022/024851 filed Jun. 22, 2022, and claims priority from Japanese Application No. 2021-104006, filed Jun. 23, 2021, the disclosure of which is hereby incorporated by reference herein in its entirety.

TECHNICAL FIELD

The present invention relates to a technology for improving a microbubble generation device including a cylindrical container body, which is closed at one end by a wall body and is open at the other end, a gas inlet provided in the wall body of the cylindrical container body on the one end side, and a pressurized liquid inlet provided in part of the circumferential wall of the cylindrical container body such that it is open in the direction of the tangent to the inner circumference thereof.

BACKGROUND ART

The microbubble technology is the technology originated in Japan, developed by Hirofumi Ohnari in 1995 for the first time in the world. Since then, the technology has achieved steady development in the field of healthcare, food, biology, environment, and energy for a quarter of a century, and has played an important role in people's daily lives and in the development of the primary and secondary industries. In the healthcare industry, microbubble generation devices are widely used for improving health, such as for cleansing, blood circulation promotion, and relaxing purposes, by being disposed in bathtubs. Also commercially available are shower devices that that can be used in a bathroom or a lavatory and that jet water containing microbubbles.

However, such shower devices have a problem in that their shower water contains a very small volume of microbubbles, which is not helpful to efficiently improve health.

The microbubble technology is also often used in the field of cleaning semiconductors and the like, and contributes to efficiently improving the water purifying capacity in the wastewater treatment thereof.

Further, in the field of cosmetics and beauty, the microbubble technology is expected to achieve the skin-cleansing and massaging effect and the effect of promoting blood circulation.

In the food industry, the microbubble technology has made achievements in improving productivity and obtaining high profitability in growing vegetables at a plant factory that utilizes the activation of plants with microbubbles. Further, the microbubble technology has also been utilized to improve aquaculture and for fattening and transportation.

Meanwhile, in the environmental field, applying the microbubble technology has contributed to growing microorganisms (i.e., activated sludge) for purifying water in a dam reservoir, a lake, and the like, and for industrial wastewater treatment, and thus has significantly improved the treatment capacity so far.

CITATION LIST

Patent Literature

Patent Literature 1: Japanese Patent Laid-Open No. 2000-447

Patent Literature 2: Japanese Patent Laid-Open No. 2007-111616

A shower device that discharges shower water containing microbubbles uses a microbubble generation method, such as a cavitation method, a gas-liquid mixing method, an ejector method, or a gas-liquid mixing method.

However, such methods share the common important problems that first of all, the volume of microbubbles generated is very small, and second, microbubbles contained in a jet flow of the shower achieve uncertain functionality, or achieve almost no effective functionality.

Specifically, when the cavitation method is used, gas components in water are eluted as relatively large microbubbles (i.e., most of them have a diameter of greater than or equal to 50 micrometers). However, the content of the gas components in the water is not high, and further, no ingenuity has been exercised to take in air from the outside. This results in a very small volume of microbubbles generated, and thus, the functionality of the microbubbles is not fully achieved.

The ejector method is intended to produce microbubbles by separating large bubbles of the intake air around the outlet of an ejector based on the principle of the Venturi effect, but the size of the bubbles is relatively large (i.e., most of them have a diameter of greater than or equal to 50 micrometers).

Further, the volume of the microbubbles generated is very small such that it remains less than or equal to about 100 mL/minute.

The gas-liquid mixing method is a method of causing the intake gas to collide with a wall, a protrusion, or the like, or causing air to pass through micropores in water so as to break up large bubbles into microbubbles.

However, it is in principle difficult to produce microbubbles based on such collision or passage of air.

Further, when the volume of the intake air is attempted to be increased, large bubbles will inevitably result. Thus, it would be difficult to generate bubbles with a diameter of, in particular, less than or equal to 30 micrometers. To avoid such a problem, the supply of air needs to be reduced, which leads to a contradiction because the volume of microbubbles generated, which are important, becomes difficult to increase.

As described above, with the existing devices, few microbubbles are generated, or even if some microbubbles can be generated, their volume is very small. Thus, no device has been provided so far that can generate shower jet water containing a large volume of microbubbles based on a simple structure.

SUMMARY OF INVENTION

Technical Problem

The present invention solves the foregoing problems, and provides a swirling-type microbubble generation device that is adapted to be used in a bathtub and can supply hot microbubble water containing a large volume of microbubbles, or is adapted to be used in a shower room or the like and can supply hot microbubble shower water containing a large volume of microbubbles.

For example, the volume of microbubbles generated when each of the following three methods is used is as follows: when the device performs a method of jetting shower water containing a large volume of microbubbles in the air, the volume of microbubbles generated is 0.91 to 0.96 liters/min at a water pressure of 0.3 MPa, when the device performs a method of, with the device placed in proximity to or in close contact with a shower-jetting target in the air, jetting shower water, the volume of microbubbles generated is 1.07 to 1.12 liters/min at a water pressure of 0.3 MPa, and when the device performs a method of generating a large volume of microbubbles in water, the volume of microbubbles generated is 1.13 to 1.18 liters/min at a water pressure of 0.3 MPa.

Solution to Problem

The present invention provides a swirling-type microbubble generation device and a swirling-type microbubble generation device for shower use having the following configurations.

[1] A swirling-type microbubble generation device including a cylindrical container body that is closed at one end by a wall body and is open at another end; a gas inlet provided in a wall body of the cylindrical container body on the one end side; and a pressurized liquid inlet provided in part of a circumferential wall of the cylindrical container body such that the pressurized liquid inlet is open in a direction of a tangent to an inner circumference of the cylindrical container body, in which a cover body is attached to an opening on the other end side, the cover body having an outwardly protruding pipe body in a center of the cover body, and an inside diameter (D1) of the container body is 2 to 4 times an inside diameter (D4) of the pipe body of the cover body [D1=(2 to 4)×D4], and a length (L2) of the pipe body is 0.2 to 2.0 times the inside diameter (D1) of the container body [L2=(0.2 to 2.0)×D1].

[2] A swirling-type microbubble generation device including a cylindrical container body that is closed at one end by a wall body and is open at another end; a gas inlet provided in a wall body of the cylindrical container body on the one end side; and a pressurized liquid inlet provided in part of a circumferential wall of the cylindrical container body such that the pressurized liquid inlet is open in a direction of a tangent to an inner circumference of the cylindrical container body, in which the wall body on the one end side is formed in a shape of a cone or a truncated cone protruding toward the other end side, and an inclination angle θ of a side face of the wall body having the shape of the cone or the truncated cone is set to 10° to 70° (preferably, 40° to 60°) so that a tip end portion of a space within the container body on the one end side, as seen in longitudinal cross-section, has an M-shape, a cover body having an outwardly protruding pipe body in a center of the cover body is securely or detachably attached to an opening of the container body on the other end side, so that a swirling gas-liquid mixture containing microbubbles is allowed to be guided through a tip end of the cover body, and an inside diameter (D1) of the container body is 2 to 4 times an inside diameter (D4) of the pipe body [D1=(2 to 4)×D4], and a length (L2) of the pipe body is 0.2 to 2.0 times the inside diameter D1 of the container body [L2=(0.2 to 2.0)×D1].

[3] The swirling-type microbubble generation device according to [1] or [2], further including a tapered portion in which the inside diameter of the container body is increased around a closed portion, in which an end of the tapered portion is formed in an arc-shape.

[4] The swirling-type microbubble generation device for shower use according to [1] or [2], in which a bottom of a disk-like housing is attached to a tip end portion of the outwardly protruding pipe body provided in the center of the cover body, and a large number of pores are provided in an upper wall of the housing.

[5] The swirling-type microbubble generation device for shower use according to [4], further including a tapered portion in which the inside diameter of the container body is increased around a closed portion, wherein an end of the tapered portion is formed in an arc-shape.

[6] The swirling-type microbubble generation device for shower use according to [4], in which a bottom face of the disk-like housing has a torus shape.

[7] The swirling-type microbubble generation device according to [1] or [2], in which each portion has the following dimensions: provided that the inside diameter (D1) of a cylindrical portion of the container body is 100, a length (L1) of the space within the container body is 40 to 400, a diameter (D2) of the pressurized liquid inlet provided in the wall body on the one end side is 8 to 30, the inside diameter (D4) of the pipe body provided in the center of the cover body is 10 to 50, the length (L2) of the pipe body is 6 to 200, a length (L4) between a rear end portion of the cover body and an opening of the pressurized liquid inlet is 8 to 15, and the following conditions: L1/D1=0.4 to 4.0 and D2/D4=0.4 to 1.0 are satisfied, and the inside diameter (D1) of the container body is 8 to 300 mm, and the length (L1) of the space within the container body is 15 to 450 mm.

[8] The swirling-type microbubble generation device for shower use according to [4] or [5], in which each portion has the following dimensions: provided that the inside diameter (D1) of a cylindrical portion of the body container is 100, a length (L1) of the space within the container body is 40 to 400, a diameter (D2) of the pressurized liquid inlet provided in the wall body on the one end side is 8 to 30, the inside diameter (D4) of the pipe body provided in the center of the cover body is 10 to 50, the length (L2) of the pipe body is 6 to 200, a length (L4) between a rear end portion of the cover body and an opening of the pressurized liquid inlet is 8 to 15, an inside diameter (D5) of the disk-like housing is 115 to 385, a thickness (L3) of the disk-like housing is 35 to 58, a diameter (D8) of the large number of pores provided in the upper wall of the housing is 1.2 to 5.8, the number of the large number of pores provided in the upper wall of the disk-like housing is 16 to 300, and the following conditions: L1/D1=0.4 to 4.0, D2/D4=0.4 to 1.0, D5/D4=1.0 to 12.5, D5/L3=1.1 to 5.0, and D7/D1=1.0 to 1.2 are satisfied, and the inside diameter (D1) of the container body is 8 to 300 mm, and the length (L1) of the space within the container body is 15 to 450 mm.

[9] The swirling-type microbubble generation device for shower use according to any one of [4], [5] and [8], in which the pores provided in the upper wall of the disk-like housing are arranged along multiple concentric circles surrounding a central portion of the upper wall.

[10] The swirling-type microbubble generation device for shower use according to [3] or [4], in which the device is configured to be able to perform one of the following three methods: a method of jetting shower water containing a large volume of microbubbles in air, a method of, with the device placed in proximity to or in close contact with a shower-jetting target in air, jetting shower water containing a large volume of microbubbles, and a method of generating a large volume of microbubbles in water.

[11] The swirling-type microbubble generation device for shower use according to [3] or [4], in which a volume of microbubbles generated when each of the three methods described in [10] is performed is as follows: when the device performs the method (a) of jetting shower water containing a large volume of microbubbles in air, the volume of microbubbles generated is 0.91 to 0.96 liters/min at a water pressure of 0.3 MPa, when the device performs the method (b) of, with the device placed in proximity to or in close contact with a shower-jetting target in air, jetting shower water, the volume of microbubbles generated is 1.07 to 1.12 liters/min at a water pressure of 0.3 MPa, and when the device performs the method (c) of generating a large volume of microbubbles in water, the volume of microbubbles generated is 1.13 to 1.18 liters/min at a water pressure of 0.3 MPa.

Advantageous Effects of Invention

The swirling-type microbubble generation device according to the present invention is configured such that the cover body, which has the outwardly protruding pipe body in its center, is attached to the opening of the container body on the other end side. Thus, it is possible to, with a simple structure, jet a swirling gas-liquid mixture containing microbubbles to a jetting target, which is located in proximity to or in close contact with the device, through the pipe body of the cover body, or jet hot water containing a large volume of microbubbles into water in a hot water tank.

In addition, with the swirling-type microbubble generation device for shower use in which the tip end portion of the cover body has attached thereto a shower portion made of a disk-like housing having an upper wall with a large number of pores, it is possible to, when the device performs a method of jetting shower water containing a large volume of microbubbles in the air, achieve a gas intake volume of 0.91 to 0.96 liters/min at a water pressure of 0.3 MPa, when the device performs a method of, with the device placed in proximity to or in close contact with a shower-jetting target in the air, jetting shower water, achieve a gas intake volume of 1.07 to 1.12 liters/min at a water pressure of 0.3 MPa, and when the device performs a method of generating a large volume of microbubbles in water, discharge hot shower water containing a large volume of microbubbles at 1.13 to 1.18 liters/min at a water pressure of 0.3 MPa.

Accordingly, the present device can be used for domestic use, for medical precision cleaning, for caregiving purposes, for cosmetic purposes, for cleaning wall surfaces, for outdoor watering, or for washing pets.

DESCRIPTION OF EMBODIMENTS

Figure 1:
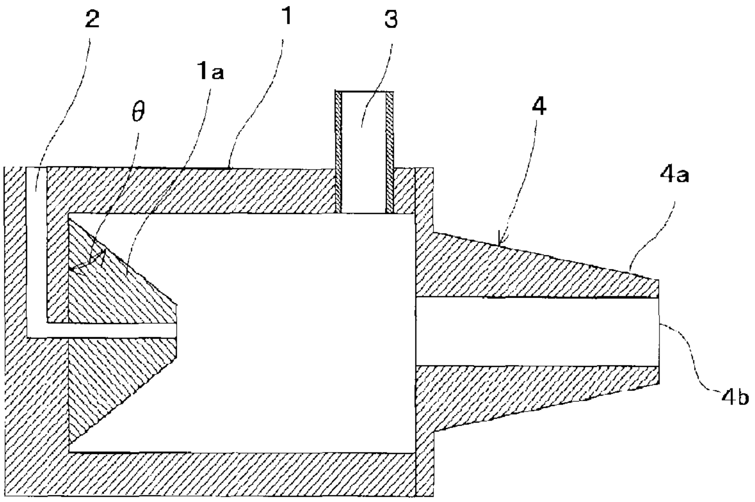
FIGS. 1(*a*), 1(*b*) and 1(*c*) are transverse cross-sectional views of a swirling-type microbubble generation device of the present invention in which FIG. 1(*a*) is a transverse cross-sectional view illustrating the basic configuration, FIG. 1(*b*) is a transverse cross-sectional view of the device including a tapered portion in which the inside diameter of a container body is increased around a closed portion, and FIG. 1(*c*) is a transverse cross-sectional view of the device in which the corner of the tip end of the tapered portion is formed in an arc-shape.
Figure 1:
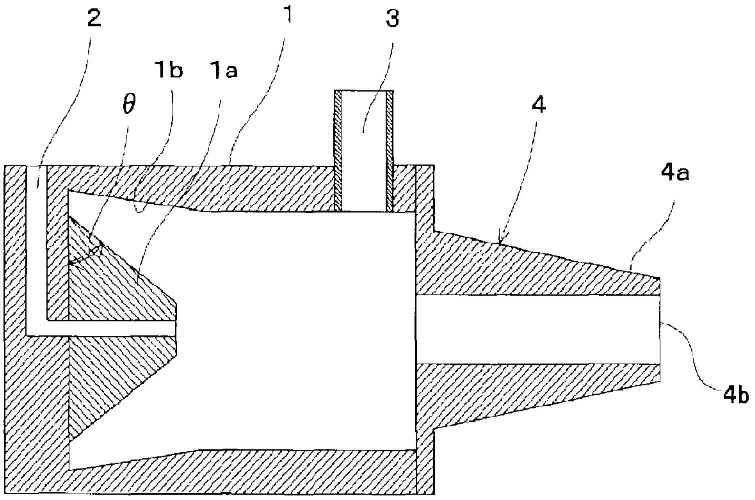
Figure 1:
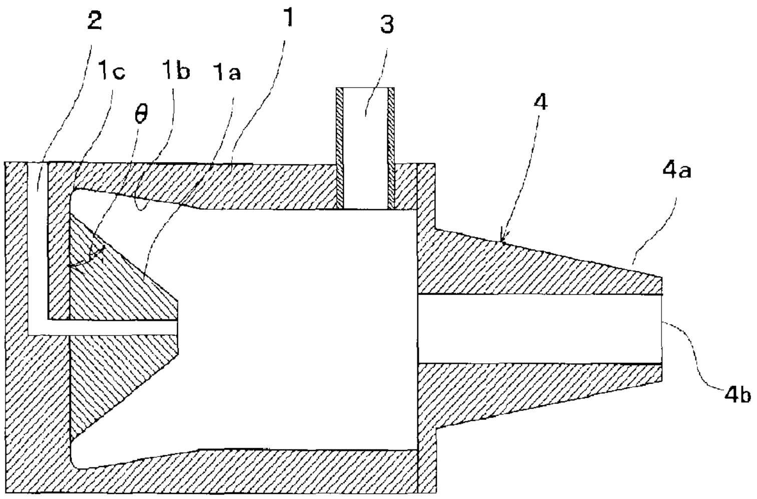

An embodiment of a swirling-type microbubble generation device of the present invention will be described with reference to the drawings. In FIGS. 1(*a*), 1(*b*) and 1(*c*), reference numeral 1 denotes a container body, reference numeral 2 denotes a gas inlet, reference numeral 3 denotes a pressurized liquid inlet, and reference numeral 4 denotes a cover body provided in a protruding manner in the opening of the container body.

Specifically, reference numeral 1*a* denotes a wall body formed on one end side in a manner protruding in the shape of a cone or a truncated cone, and reference numeral 1*b* denotes a tapered portion in which the inside diameter of the container body 1 is increased around a closed portion. In addition, a pipe body 4*b* denotes an outlet for a swirling gas-liquid mixture containing microbubbles that is provided in a pipe body 4*a*.

The swirling-type microbubble generation device of the present invention is a microbubble generation device that includes, as illustrated in FIGS. 1(*a*), 1(*b*) and 1(*c*), the cylindrical container body 1, which is closed at one end and is open at the other end, the gas inlet 2 provided in the wall body 1*a* of the cylindrical container body 1 on the one end side, and the pressurized liquid inlet 3 provided in part of the circumferential wall of the cylindrical container body 1 such that it is open in the direction of the tangent to the inner circumference thereof in which the wall body 1*a* on the one end side is formed in the shape of a cone or a truncated cone protruding toward the other end side, and the inclination angle θ of the side face of the wall body having the shape of the cone or the truncated cone is set to 10° to 70° (preferably, 40° to 60°) so that the tip end of the space within the container body 1 on the one end side, as seen in longitudinal cross-section, has an M-shape, and thus is configured to guide a swirling gas-liquid mixture containing microbubbles through an opening of the container body on the other end side, and further, the cover body 4 having the outwardly protruding pipe body 4*a* in its center is attached to the opening on the other end side.

Figure 2:
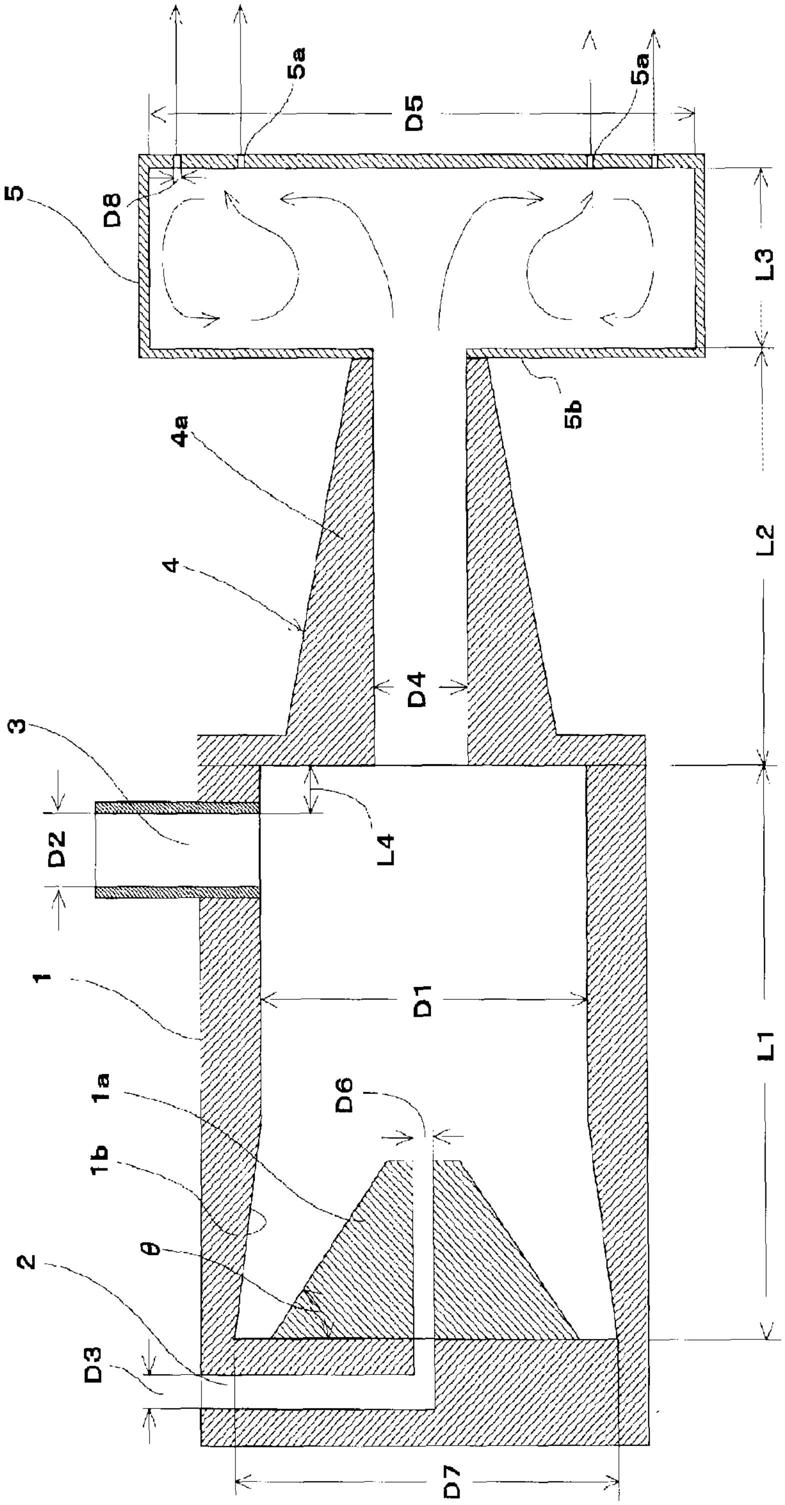
FIG. 2 is a transverse cross-sectional view of a swirling-type microbubble generation device for shower use of the present invention in which a shower jet portion is formed of a disk-like housing.

As illustrated in FIG. 2, the inside diameter (D4) of the pipe body 4*a* is 0.25 to 0.5 times the inside diameter (D1) of the container body 1 [D4=(0.25 to 0.50)×D1], that is, [D1=(2 to 4)×D4], and the length (L2) of the pipe body 4*a* is 0.2 to 2.0 times the inside diameter (D1) of the container body 1 [L2=(0.2 to 2.0)×D1]. The reason for setting the inside diameter (D4) of the pipe body 4*a* to 0.25 to 0.5 times the inside diameter (D1) of the container body 1 is that if D4 is greater than 0.5×D1, no pressure would be applied within the container body 1, with the result that the flow rate of the liquid jet would increase, which in turn would decrease the gas intake function at a swirling gas cavity portion on the central axis of the body 1 so that the gas intake volume would decrease, while if D4 is less than 0.25×D1, pressure within the container body 1 would become too high, with the result that the flow rate of the liquid jet would decrease, which in turn would also decrease the flow rate of the intake gas.

Meanwhile, the reason for setting the length (L2) of the pipe body 4*a* to 0.2 to 2.0 times the inside diameter (D1) of the container body 1 is to control the spread angle of a jet flow containing microbubbles in water at the outlet 4*b* for a swirling gas-liquid mixture containing microbubbles, which is provided in the cover body, to be in the range of 1020 to 85°. The spread angle of a jet flow when the length (L2) of the pipe body 4*a* is set to 0.2×D1 is 1020 (i.e., the actual measurement value), and the spread angle of a jet flow when the length (L2) of the pipe body 4*a* is set to 2.0×D1 is 850 (i.e., the actual measurement value). If the spread angle of the jet flow is greater than or equal to 102°, the flow within the housing would spread too wide in the lateral direction, and thus, a so-called "secondary flow (i.e., a secondary flow in a direction perpendicular to the direction of the main flow)" would have a non-circular, flat shape, resulting in an increased pressure drag of the fluid, and thus resulting in a decreased gas intake volume. Conversely, if the spread angle is less than or equal to 85°, the jet flow would directly collide with a wall surface in the shape of a housing, and after the collision, the jet flow would spread in the lateral direction so that the resulting secondary flow would not be formed in a circular shape. Thus, the spread width of the flow would become too narrow, which in turn would decrease the function of discharging the jet flow through the outlet 4*b* for a swirling gas-liquid mixture containing microbubbles that is provided in the cover body. This results in a decreased volume of the intake gas sucked through the gas inlet 2.

Note that in the foregoing, it is preferable that the pressure of a pressurized liquid introduced into the cylindrical container body 1 through the pressurized liquid inlet 3, which is provided in part of the circumferential wall of the cylindrical container body 1 such that it is open in the direction of the tangent to the inner circumference thereof, be 0.1 to 0.3 MPa, the flow rate of the liquid jet be 7 to 15 liters/min, and the number of revolutions of the pressurized liquid within the cylindrical container body 1 be 450 to 600 per minute. It has been experimentally confirmed that when the number of revolutions is in such a range, a large volume of microbubbles with a diameter mode of 20 to 30 micrometers is generated at about 1 liter/min (see FIG. 5). Needless to say, it has also been experimentally clarified that when the number of revolutions is smaller than the foregoing range, sufficient microbubbles, in terms of both their size and volume, are not generated.

Next, FIG. 2 illustrates a swirling-type microbubble generation device for shower use. That is, the device includes the cylindrical container body 1, which is closed at one end by a wall body and is open at the other end, the gas inlet 2 provided in the wall body 1*a* of the cylindrical container body 1 on the one end side, and the pressurized liquid inlet 3 provided in part of the circumferential wall of the cylindrical container body 1 such that it is open in the direction of the tangent to the inner circumference thereof. The wall body 1*a* on the one end side is formed in the shape of a cone or a truncated cone protruding toward the other end side, and the inclination angle θ of the side face of the wall body having the shape of the cone or the truncated cone is set to 10° to 70° (preferably, 40° to 60°) so that the tip end of the space within the container body 1 on the one end side, as seen in longitudinal cross-section, has an M-shape, and thus is configured to guide a swirling gas-liquid mixture containing microbubbles through an opening of the container body 1 on the other end side. Further, the cover body 4 having the outwardly protruding pipe body 4*a* in its center is attached to the opening on the other end side. The inside diameter (D1) of the container body 1 is 2.0 to 4.0 times the inside diameter (D4) of the pipe body 4*a*, that is, D1=(2.0 to 4.0)×D4. The length (L2) of the pipe body 4*a* is 0.2 to 2.0 times the inside diameter (D1) of the container body 1, that is, L2=(0.2 to 2.0)×D1. In addition, the tip end portion of the pipe body 4*a* has attached thereto a bottom of a disk-like housing 5, and the upper wall of the housing 5 is provided with a large number of pores 5*a*.

Regarding the dimensions of each portion in FIGS. 1 and 2, it is preferable that provided that the inside diameter (D1) of the container body 1 is 100, the length (L1) of the space within the container body 1 be 40 to 400, the diameter (D2) of the pressurized liquid inlet 3 provided in a protruding manner in the wall body 1*a* on the one end side be 8 to 30, the inside diameter (D4) of the pipe body 4*a* of the cover body 4 be 10 to 50, the length (L2) of the pipe body 4*a* be 6 to 200, the length (L4) between the rear end portion of the pipe body 4*a* and the opening of the pressurized liquid inlet 3 be 8 to 15, the inside diameter (D5) of the disk-like housing 5 be 115 to 385, the thickness (L3) of the disk-like housing 5 be 35 to 58, and the diameter (D8) of the large number of pores 5*a* provided in the upper wall of the disk-like housing 5 be 1.2 to 5.8. It is also preferable that the number of the large number of pores 5*a* provided in the upper wall of the disk-like housing 5 be 16 to 300, and the following dimensional conditions: L1/D1=0.4 to 4.0, D2/D4=0.4 to 1.0, D5/D4=1.0 to 12.5, D5/L3=1.1 to 5.0, and D7/D1=1.0 to 1.2 be satisfied, and also, the inside diameter (D1) of the container body 1 be 8 to 300 mm, and the length (L1) of the space within the container body 1 be 15 to 450 mm.

The reason for determining the foregoing range of each numerical value is as follows.

(1) The reason for limiting D4 to the range of (0.25 to 0.5)×D1 is to exercise ingenuity to allow, when the device is placed in the air, a large volume of gas to be sucked through the gas inlet 3 at 0.91 to 0.96 liters/min, and allow almost the entire portion of the sucked gas to become microbubbles. Specifically, if D4 is set to less than 0.25×D1, the difference between the diameter of the container body 1 and the diameter of the pipe body of the cover body 4 provided in a protruding manner in the opening of the container body becomes larger, and the ratio of the diameter of the container body 1 to the diameter of the cover body 4 provided in a protruding manner in the opening becomes 4 times or greater. In such a case, the frictional resistance of a water flow against a wall surface within the cover body 4 provided in a protruding manner in the opening would increase, and its pressure would also increase. Consequently, the increased pressure is transmitted to the opening of the container body 1, which in turn would decrease the volume of the intake gas sucked through the gas intake portion of the body 1. Thus, it becomes difficult to generate a large volume of microbubbles.

Conversely, if D4 is greater than 0.5×D1, the proportion of D4 to D1 becomes relatively high. Thus, the cover body 4 provided in a protruding manner in the opening has a size closer to the size of the body 1. In such a case, pressure within the body 1 is not appropriately increased, which in turn causes a fluid to more easily flow into the cover body 4 from the body 1. This results in significantly decreased efficiency of the intake of gas through the gas inlet of the body 1.

Therefore, limiting D4 to (0.25 to 0.5)×D1 is the important ingenuity exercised to allow for the intake of a large volume of gas through the gas inlet of the body 1. Specifically, such a range is the optimal range experimentally confirmed by arranging the cover body 4 with an appropriate diameter and length for appropriately controlling the pressure of a water flow within the body 1.

(2) As described previously, the reason for securely providing the cover body 4 in a protruding manner in the opening of the body container 1 is to exercise the important ingenuity to allow for the intake of a large volume of gas, and break up the gas into microbubbles.

Such a cover body 4 is arranged with the intention of the following:

1) to allow for the intake of a larger volume of gas, and 2) to reduce, with the cover body 4 provided in a protruding manner in the opening, the spread angle of a jet flow coming from the container body (specifically, to 1020 to 85°) at the outlet of the cover body 4 provided in a protruding manner in the opening, and allow the jet flow to collide with a wall surface of the disk-like housing 5 of the shower jet portion around the central portion thereof, and thus form a more strong, circular, smooth secondary flow.

In the pipe body 4*a* of the cover body 4 provided in a protruding manner in the opening, the outer portion of a circulating liquid has a speed decreased due to the frictional resistance against the wall surface, whereas the swirl speed of a swirling gas around the central axis on the inner side would hardly decrease because no frictional resistance is generated at the interface between the swirling water flow and the swirling gas cavity portion. This plays an important role in breaking up the intake gas into microbubbles based on the difference in the rotational speed of the swirling water flow between the inner side and the outer side around the outlet of the pipe body 4*a*, and thus contributes greatly to the generation of a large volume of microbubbles.

As described above, the reason for limiting D4 to the range of (0.25 to 0.5)×D1 is to allow for the intake of a large volume of gas through the gas inlet, and thus generate a large volume of microbubbles from the gas. Such a limitation can be regarded as the essential technical feature for generating shower water containing microbubbles.

In addition, the reason for setting L2 to (0.2 to 2.0)×D1 is to allow, not only when the device in water is infiltrated but also when the device is placed in the air, shower water containing an enormous volume of microbubbles to generated and jetted at 0.91 to 0.96 liters/min. To this end, it is first necessary to set the length L2 of the cover body 4 provided in a protruding manner in the opening to an appropriate length: (0.2 to 2.0)×D1 relative to the diameter D1 of the body container 1. It has been experimentally confirmed that if the length L2 is set to less than 0.2 times the diameter D1, the spread angle of a jet flow around the outlet would exceed 102°, while if the length L2 is set to 2.0×D1, the spread angle would decrease to 85°. However, since the gas intake volume is almost the same regardless of whether the spread angle of the jet flow is 1020 or 85°, it is possible to, by changing the length L2 of the cover body 4 in the range of (0.2 to 2.0)×D1 and thus controlling the spread angle of the jet flow, change the degree of collision of the jet flow against the upper end wall of the housing 5 while maintaining almost the same volume of the intake gas sucked through the gas inlet.

In addition, with the decreased spread angle of the jet flow around the outlet of the cover body 4 provided in a protruding manner in the opening, the straight traveling property of the swirling gas-liquid two-phase flow is developed while the swirl speed of the swirling flow in the swirling gas cavity portion on the central axis is maintained. This results in a further increased volume of the intake gas sucked through the gas inlet of the body container.

Conversely, if the length L2 of the cover body 4 provided in a protruding manner in the opening is set to greater than 2 times the diameter D1 of the body container 1, wall surface frictional resistance, which is generated when a jet flow flows along the inner wall surface of and through the inside of the cover body 4 provided in a protruding manner in the opening while swirling, would significantly increase, resulting in a decreased swirl speed and a decreased flow speed of the jet flow. Thus, pressure within the cover body 4 and the body container 1 would increase, and the volume of the intake gas sucked through the gas inlet would thus decrease, resulting in a decreased volume of microbubbles generated.

Therefore, since L2 should not be too short or too long relative to D1, it is very important to appropriately limit the length L2 to the range of (0.2 to 2.0)×D1. Specifically, a value around L2=0.9×D1 is most preferable within such a limited range.

Example 1

Example 1 of the swirling-type microbubble generation device of the present invention has the most basic configuration. Specifically, as illustrated in FIG. 1(*a*), the device includes the cylindrical container body 1, which is closed at one end by a wall body and is open at the other end, the gas inlet 2 provided in the wall body of the cylindrical container body 1 on the one end side, and the pressurized liquid inlet 3 provided in part of the circumferential wall of the cylindrical container body 1 such that it is open in the direction of the tangent to the inner circumference thereof. The wall body 1*a* on the one end side is formed in the shape of a cone or a truncated cone protruding toward the other end side, and the tip end thereof is provided with an outlet of the gas inlet 2. The cover body 4 having the outwardly protruding pipe body 4*a* in its center is attached to the opening on the other end side. The tip end of the pipe body 4*a* is provided with a jet nozzle 4*b* for a swirling gas-liquid mixture containing microbubbles.

Example 2

Example 2 of the swirling-type microbubble generation device of the present invention includes, as illustrated in FIG. 1(*b*), a tapered portion 1*b* in which the inside diameter of the container body 1 is increased around the closed portion so that a swirling flow of a pressurized liquid introduced through the pressurized liquid inlet 3 spreads in the tapered portion 1*b*, and reaches deep inside the container body 1 without its rotating force decreased. Such a device can increase the volume of the intake gas sucked through the gas inlet 2 in comparison with the device of Example 1.

Example 3

Example 3 of the swirling-type microbubble generation device of the present invention is configured such that, as illustrated in FIG. 1(*c*), the sidewall of the container body has a reduced thickness around an end portion 1*c* of the tapered portion 1*b*, and the corner of the end portion 1*c* of the tapered portion 1*b* is formed in an arc-shape because it is likely to be damaged when a liquid containing sand or metallic powder is flowed therethrough. Such a configuration has been obtained by exercising the important ingenuity to locally reduce and stably control the swirl speed of a swirling flow around the corner, and thus prevent damage, which would otherwise occur due to the generation of a local flow around the corner.

Example 4

Next, a swirling-type microbubble generation device for shower use of the present invention will be described based on FIGS. 2 and 3. Note that the present swirling-type microbubble generation device and a generation mechanism thereof are the same as those illustrated in FIGS. 1(*a*), 1(*b*) and 1(*c*). Thus, the description thereof will be omitted, and the following description is limited to a shower jet portion 5 attached to the tip end portion of the cover body 4 of the swirling-type microbubble generation device.

Figure 4:
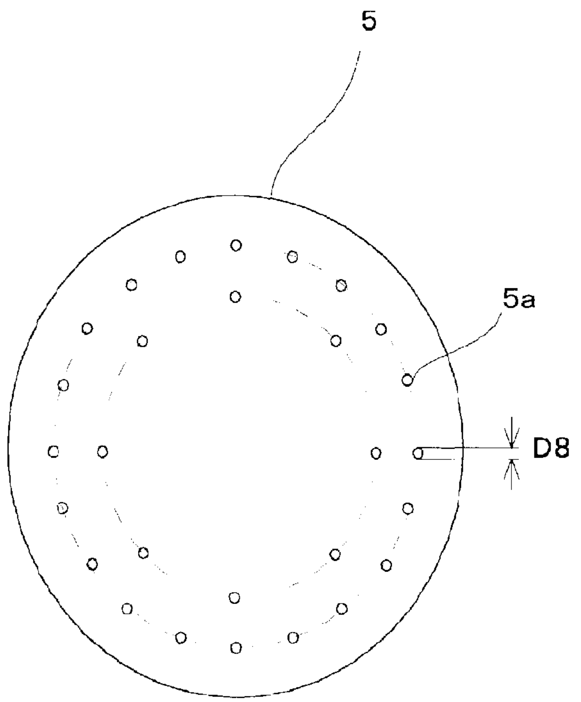
FIG. 4 is a view illustrating an arrangement example of pores in the housing of the swirling-type microbubble generation device for shower use.

The swirling-type microbubble generation device for shower use illustrated in FIG. 2 is configured such that a shower jet portion (i.e., a disk-like housing) 5 formed of a disk-like housing is detachably provided on the tip end portion of the cover body 4 of the swirling-type microbubble generation device, and, as illustrated in FIG. 4, a large number of pores 5*a* are arranged along multiple concentric circles in a portion excluding the central portion of the upper wall of the disk-like housing 5. FIG. 4 illustrates an example in which 20 pores and 8 pores, each having a diameter of 1.1 mm, used in Example 4 are respectively arranged along the outer circle and the inner circle of the two concentric circles. Controlling the diameter of each pore 5*a* can control the jet pressure and the flow rate, and controlling the number of the pores 5*a* can also control the flow rate and the pressure. Thus, the shower jet portion can be designed for the intended use.

In the disk-like housing 5, a swirling gas-liquid mixture jetted from the cover body 4 of the swirling-type microbubble generation device is caused to collide with the central portion, which includes no pore, of the upper wall of the disk-like housing 5, so that a secondary flow spreading laterally and uniformly in all directions is formed. Forming such a secondary flow can reduce the pressure around the point of collision more than when such a lateral flow is not formed. This results in an increased volume of the swirling gas-liquid mixture flowing from the container body 1, and further results in an increased volume of the intake air sucked through the gas inlet of the container body 1. Thus, shower water containing a large volume of microbubbles can be jetted in the air or in water. Note that a swirling gas-liquid mixture flowing in the lateral direction collides with the sidewall of the disk-like housing 5 to form a more strong, circular secondary flow as illustrated in FIGS. 2 and 3, and thus is jetted as shower water with a strong force through the pores 5*a* provided in the peripheral portion of the housing.

Example 5

Figure 3:
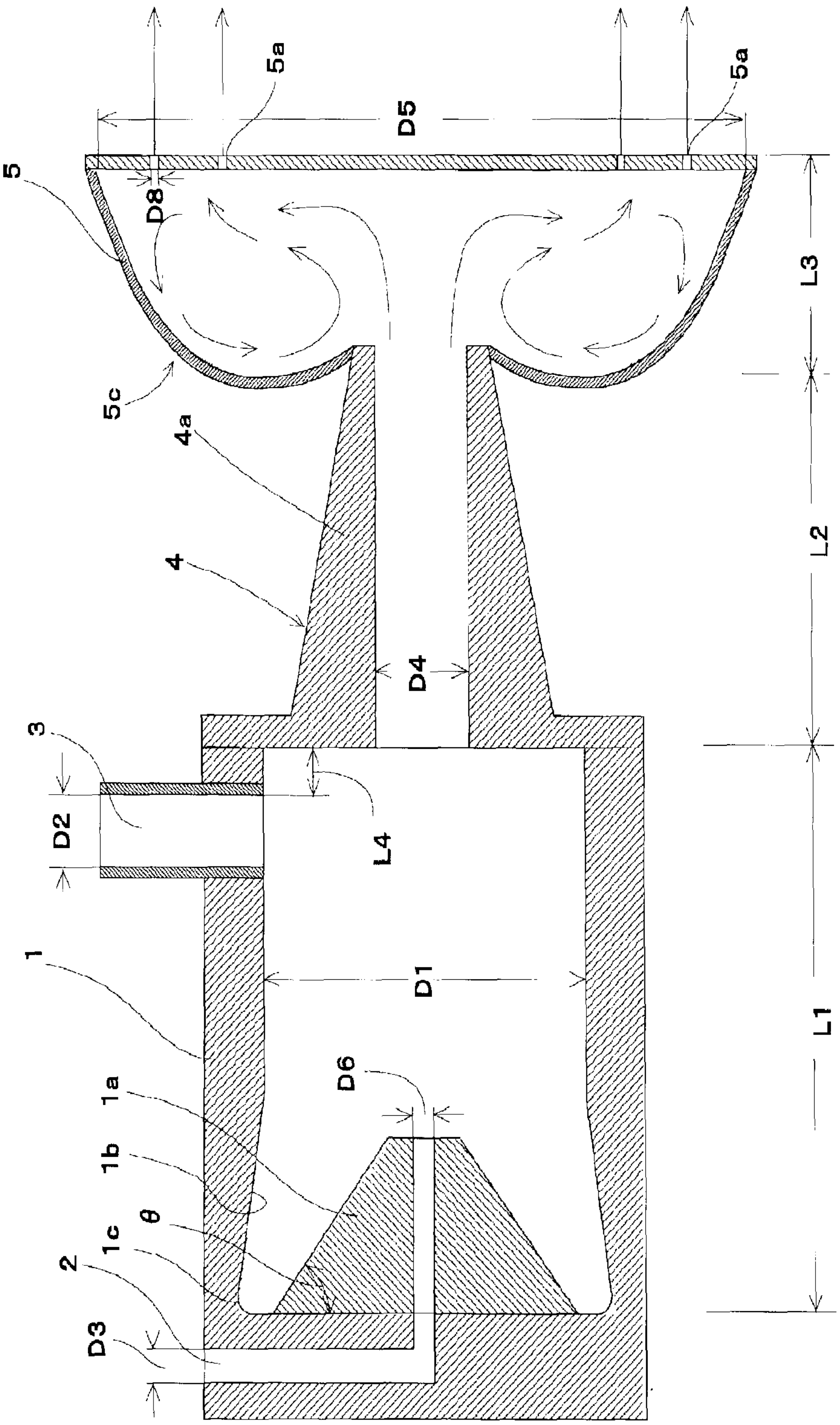
FIG. 3 is a transverse cross-sectional view of a swirling-type microbubble generation device for shower use of the present invention in which a shower jet portion has a disk-like housing with a bottom face having a torus shape.

The swirling-type microbubble generation device for shower use illustrated in FIG. 3 is configured such that the shower jet portion 5 formed of the disk-like housing 5 is detachably provided on the tip end portion of the cover body 4 of the swirling-type microbubble generation device, and, as illustrated in FIG. 4, shower jet pores 5*a* including a large number of pores are arranged along multiple concentric circles in a portion excluding the central portion of the upper wall of the disk-like housing 5, and also, the bottom face of the disk-like housing is formed in a torus shape 5*c*. This allows a flow of a swirling gas-liquid mixture generated in the disk-like housing to be formed as a smoother, circulating secondary flow, and thus allows for the stable discharge of a jet flow containing a large volume of microbubbles.

Example 6

Figure 5:
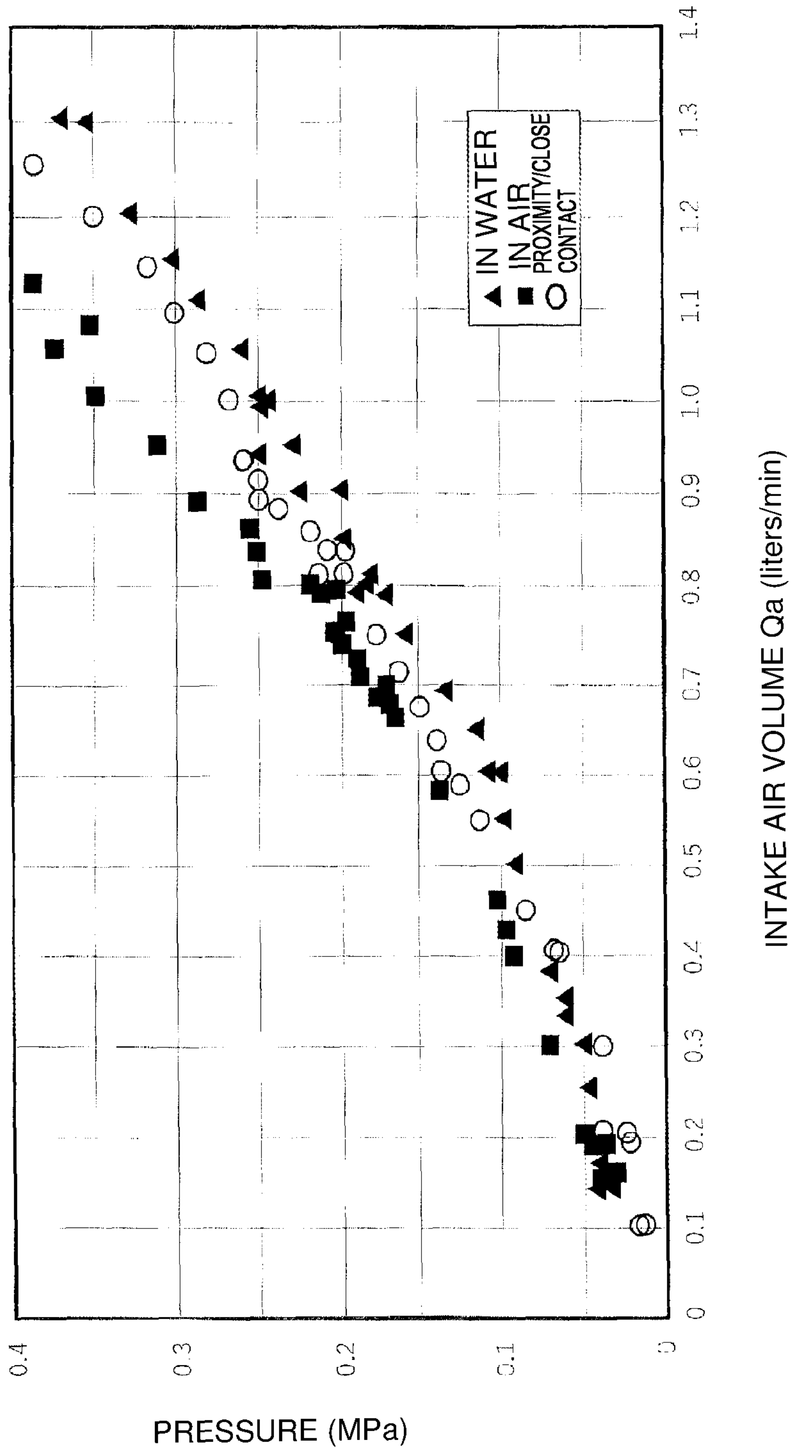
FIG. 5 is a graph illustrating changes in the intake air volume (which is almost identical to the volume of microbubbles generated) when shower water is jetted using the swirling-type microbubble generation device for shower use.

A graph in FIG. 5 illustrates examples of the relationship between the pressure P of a water flow at the liquid inlet and the volume Qa of the intake air sucked through the gas inlet 2 as measured with the swirling-type microbubble generation device for shower use illustrated in FIG. 3. Specifically, FIG. 5 is a graph illustrating the relationship between the pressure P of a water flow at the liquid inlet and the volume Qa of the intake air sucked through the gas inlet 2 as measured with the device of FIG. 3 in which D1=27 mm, D2=5.5 mm, L1=30 mm, L2=24 mm, and L3=13 mm. In such a case, the intake air volume Qa may be regarded as almost identical to the volume of microbubbles generated. The liquid was supplied to the device from the end faucet for tap water at home. According to the current Japanese Water Works Law, the pressure of a water flow at the end faucet is specified as about 0.3 MPa. Thus, the measurement range of the present data includes such a pressure value.

Accordingly, it is obvious that when a faucet for tap water is opened to increase the pressure (which is synonymous with “to increase the flow rate”), there is a tendency that the intake air volume, that is, the volume of microbubbles generated initially increases linearly, and then starts to increase more in a parabolic manner after the pressure has exceeded 0.1 MPa.

Regarding a device configured to jet shower water containing a large volume of microbubbles in the air, the volume of the jetted microbubbles is 0.91 to 0.96 liters/min when the pressure of tap water is 0.3 MPa as usual. Regarding a device that is similarly configured to jet shower water in the air by being placed in proximity to or in close contact with a shower-jetting target, the volume of the generated microbubbles is 1.07 to 1.12 liters/min when the pressure of tap water (i.e., the water pressure P at the pressurized liquid inlet) is similarly 0.3 MPa as usual. Further, regarding a device configured to be generate a large volume of microbubbles in water, the volume of the generated microbubbles is 1.13 to 1.18 liters/min when the pressure of tap water is similarly 0.3 MPa as usual. In this manner, the swirling-type microbubble generation device for shower use of the present invention may use any one of the three shower jetting methods. The device has an important feature in being able to jet shower water containing a large volume of microbubbles regardless of which method is used.

Note that there has been no existing device that can jet shower water containing a large volume of microbubbles as described above, and thus, the present invention is recognized as being novel and involving an inventive step in its feature.

Hereinafter, the novelty and the inventive step of the present invention will be specifically itemized.

<1> Provided is a swirling-type microbubble generation device that can generate a large volume of microbubbles regardless of which of the three methods: shower jetting in the air, proximity or close-contact shower jetting, and shower jetting in water is used. The present invention is recognized as being novel as there has been no such type of device.

<2> For example, when the water pressure is 0.2 to 0.3 MPa, a large volume of microbubbles can be generated at 0.75 to 0.96 liters/min in the air. Most of the existing similar shower devices have an intake air volume that is not clearly specified or is unclear. However, even if such devices can suck air and its volume is large, the volume is estimated at about 50 milliliters/min at the most. Thus, the present invention is recognized as involving an inventive step as it can significantly increase the volume of the intake air (i.e., the volume of microbubbles generated) by about 15 to 19 times those of the conventional devices.

<3> Meanwhile, when the device is sunk in water to generate optical microbubbles, the air intake volume, that is, the volume of optical microbubbles generated is increased more. Specifically, it is obvious that a large volume of air can be sucked, that is, a large volume of microbubbles can be generated at 0.9 to 1.18 liters/min when the water pressure is 0.2 to 0.3 MPa. The volume of microbubbles generated with most of the existing devices is about 100 milliliters/min at the most. Thus, the volume of microbubbles generated with the device of the present invention is about 9 to 10 times those of the existing devices.

<4> As described above, a large volume of microbubbles is generated in the air, in proximity to or in close contact with a target in the air, or in water, which has a significant meaning in producing the following advantages.

1) A cleansing function can be achieved that is far more precise than that of the conventional shower jetting. This is because microbubbles have negative potentials (i.e., -several ten millivolts), and thus have the excellent operational advantage in cleansing organic dirt, which has a positive potential, on a jetting target through sticking, permeation, and separation.

2) When ordinary shower water or shower water containing few microbubbles is jetted onto the skin surface, a problem would arise that if the pore size is reduced to increase pressure, the skin would feel pain. However, when the jetted water contains a large volume of microbubbles, the impact of the collision is mitigated, and the associated pain is improved. Further, a "comfortable" massaging effect is produced.

3) With the housing 5 of the present device, the dissolution of air and nitrogen is promoted more after a large volume of microbubbles is generated. This allows for the jetting of water containing higher concentrations of oxygen and nitrogen components, and thus is estimated to achieve an operational advantage in improving the physiological activity, such as increasing the stimulation of the sensory nerve in the skin surface, and promoting blood circulation.

In view of the foregoing novelty and utility, the present invention, which is directed to a shower device containing a large volume of microbubbles, overturns the concept of the conventional shower, and has utility and an inventive step as the next-generation shower device.

REFERENCE SIGNS LIST

1 container body
1*a* wall body provided on one end side and protruding in cone or truncated cone shape
θ inclination angle of side face of wall body protruding in cone or truncated cone shape
1*b* tapered portion in which inside diameter of container body is increased around closed portion
1*c* arc-shaped corner of tip end of tapered portion
2 gas inlet
3 pressurized liquid inlet
4 cover body provided in protruding manner in opening of container body
4*a* pipe body
4*b* outlet provided in cover body for swirling gas-liquid mixture containing microbubbles disk-like housing as shower jet portion
5*a* shower jet pore
5*b* bottom of housing
5*c* bottom face with torus shape

The invention claimed is:

1. A swirling-type microbubble generation device comprising:
a cylindrical container body that is closed at one end by a wall body and is open at another end;
a gas inlet provided in a wall body of the cylindrical container body on the one end side; and
a pressurized liquid inlet provided in part of a circumferential wall of the cylindrical container body such that the pressurized liquid inlet is open in a direction of a tangent to an inner circumference of the cylindrical container body,
wherein:
a cover body is attached to an opening on the other end side, the cover body having an outwardly protruding pipe body in a center of the cover body, and
an inside diameter (D1) of the container body is 2 to 4 times an inside diameter (D4) of the pipe body [D1=(2 to 4)×D4], and a length (L2) of the pipe body is 0.2 to 2.0 times the inside diameter D1 of the container body [L2=(0.2 to 2.0)×D1].

2. A swirling-type microbubble generation device comprising:
a cylindrical container body that is closed at one end by a wall body and is open at another end;
a gas inlet provided in a wall body of the cylindrical container body on the one end side; and
a pressurized liquid inlet provided in part of a circumferential wall of the cylindrical container body such that the pressurized liquid inlet is open in a direction of a tangent to an inner circumference of the cylindrical container body,
wherein:
the wall body on the one end side is formed in a shape of a cone or a truncated cone protruding toward the other end side, and an inclination angle θ of a side face of the wall body having the shape of the cone or the truncated cone is set to 10° to 70° so that a tip end portion of a space within the container body on the one end side, as seen in longitudinal cross-section, has an M-shape,
a cover body having an outwardly protruding pipe body in a center of the cover body is securely or detachably attached to an opening of the container body on the other end side, so that a swirling gas-liquid mixture containing microbubbles is allowed to be guided through a tip end of the cover body, and
an inside diameter (D1) of the container body is 2 to 4 times an inside diameter (D4) of the pipe body [D1=(2 to 4)×D4], and a length (L2) of the pipe body is 0.2 to 2.0 times the inside diameter D1 of the container body [L2=(0.2 to 2.0)×D1].

3. The swirling-type microbubble generation device according to claim 1, further comprising a tapered portion in which the inside diameter of the container body is increased around a closed portion, wherein an end of the tapered portion is formed in an arc-shape.

4. The swirling-type microbubble generation device according to claim 1, further comprising:

a bottom of a disk-like housing is attached to a tip end portion of the outwardly protruding pipe body provided in the center of the cover body, and a large number of pores are provided in an upper wall of the housing.

5. The swirling-type microbubble generation device according to claim 4, further comprising a tapered portion in which the inside diameter of the container body is increased around a closed portion, wherein an end of the tapered portion is formed in an arc-shape.

6. The swirling-type microbubble generation device according to claim 4, further comprising a bottom face of the disk-like housing having a torus shape.

7. The swirling-type microbubble generation device according to claim 1, wherein each portion has the following dimensions:

provided that the inside diameter (D1) of a cylindrical portion of the container body is 100, a length (L1) of the space within the container body is 40 to 400, a diameter (D2) of the pressurized liquid inlet provided in the wall body on the one end side is 8 to 30, the inside diameter (D4) of the pipe body provided in the center of the cover body is 10 to 50, the length (L2) of the pipe body is 6 to 200, a length (L4) between a rear end portion of the cover body and an opening of the pressurized liquid inlet is 8 to 15, and the following conditions: L1/D1=0.4 to 4.0 and D2/D4=0.4 to 1.0 are satisfied, and the inside diameter (D1) of the container body is 8 to 300 mm, and the length (L1) of the space within the container body is 15 to 450 mm.

8. The swirling-type microbubble generation device according to claim 4, wherein each portion has the following dimensions:

provided that the inside diameter (D1) of a cylindrical portion of the body container is 100, a length (L1) of the space within the container body is 40 to 400, a diameter (D2) of the pressurized liquid inlet provided in the wall body on the one end side is 8 to 30, the inside diameter (D4) of the pipe body provided in the center of the cover body is 10 to 50, the length (L2) of the pipe body is 6 to 200, a length (L4) between a rear end portion of the cover body and an opening of the pressurized liquid inlet is 8 to 15, an inside diameter (D5) of the disk-like housing is 115 to 385, a thickness (L3) of the disk-like housing is 35 to 58, a diameter (D8) of the large number of pores provided in the upper wall of the housing is 1.2 to 5.8, the number of the large number of pores 5*a* provided in the upper wall of the disk-like housing is 16 to 300, and the following conditions: L1/D1=0.4 to 4.0, D2/D4=0.4 to 1.0, D5/D4=1.0 to 12.5, D5/L3=1.1 to 5.0, and D7/D1=1.0 to 1.2 are satisfied, and the inside diameter (D1) of the container body is 8 to 300 mm, and the length (L1) of the space within the container body is 15 to 450 mm.

9. The swirling-type microbubble generation device according to claim 4, wherein the pores provided in the upper wall of the disk-like housing are arranged along multiple concentric circles surrounding a central portion of the upper wall.

10. The swirling-type microbubble generation device according to claim 3, wherein the device includes a disk-like housing to be able to perform one of the following three methods:

(a) jetting shower water containing a large volume of microbubbles in air, (b) with the device placed in proximity to a target, jetting shower water containing a larger volume of microbubbles than in method (a), and (c) generating a large volume of microbubbles in water.

11. The swirling-type microbubble generation device according to claim 10, wherein a volume of microbubbles generated when each of the three methods is performed is as follows:

when the device performs the method (a) of jetting shower water containing a large volume of microbubbles in air, the volume of microbubbles generated is 0.91 to 0.96 liters/min at a water pressure of 0.3 MPa, when the device performs the method (b) of, with the device placed in proximity to the target, jetting shower water, the volume of microbubbles generated is 1.07 to 1.12 liters/min at a water pressure of 0.3 MPa, and when the device performs the method (c) of generating a large volume of microbubbles in water, the volume of microbubbles generated is 1.13 to 1.18 liters/min at a water pressure of 0.3 MPa.

* * * * *